US008566161B2

(12) United States Patent
Park et al.

(10) Patent No.: US 8,566,161 B2
(45) Date of Patent: Oct. 22, 2013

(54) METHOD AND SYSTEM FOR DETERMINING A POSITION OF INFORMATION BASED ON AN INTENTION OF A PARTY CONCERNED

(76) Inventors: Minho Park, Hilliard, OH (US); Jiho Park, Seoul (KR)

( * ) Notice: Subject to any disclaimer, the term of this patent is extended or adjusted under 35 U.S.C. 154(b) by 901 days.

(21) Appl. No.: 11/971,337

(22) Filed: Jan. 9, 2008

(65) Prior Publication Data
US 2008/0167948 A1 Jul. 10, 2008

(30) Foreign Application Priority Data
Jan. 9, 2007 (KR) .................. 10-2007-0002371

(51) Int. Cl.
*G06Q 30/00* (2012.01)
*G07B 17/00* (2006.01)
*G07F 19/00* (2006.01)

(52) U.S. Cl.
USPC ............ 705/14.55; 705/14.66; 705/14.67; 705/14.4; 705/30

(58) Field of Classification Search
USPC ..................... 705/14.4–14.73, 30
See application file for complete search history.

(56) References Cited

U.S. PATENT DOCUMENTS

| 6,269,361 | B1 | 7/2001 | Davis et al. | |
|---|---|---|---|---|
| 6,282,713 | B1 * | 8/2001 | Kitsukawa et al. | 725/36 |
| 2001/0047291 | A1 * | 11/2001 | Garahi et al. | 705/10 |
| 2001/0047298 | A1 * | 11/2001 | Moore et al. | 705/14 |
| 2002/0069405 | A1 * | 6/2002 | Chapin et al. | 725/32 |
| 2003/0070167 | A1 * | 4/2003 | Holtz et al. | 725/32 |
| 2004/0002904 | A1 * | 1/2004 | Deas et al. | 705/27 |
| 2004/0249709 | A1 * | 12/2004 | Donovan et al. | 705/14 |
| 2006/0095336 | A1 * | 5/2006 | Heckerman et al. | 705/26 |
| 2006/0184800 | A1 * | 8/2006 | Rosenberg | 713/186 |
| 2007/0027751 | A1 * | 2/2007 | Carson et al. | 705/14 |
| 2007/0118432 | A1 * | 5/2007 | Vazirani et al. | 705/26 |
| 2007/0162379 | A1 * | 7/2007 | Skinner | 705/37 |
| 2007/0260677 | A1 | 11/2007 | DeMarco et al. | |
| 2008/0004962 | A1 * | 1/2008 | Muthukrishnan et al. | 705/14 |
| 2008/0256064 | A1 * | 10/2008 | Grois | 707/5 |
| 2008/0295129 | A1 * | 11/2008 | Laut | 725/34 |
| 2009/0099902 | A1 * | 4/2009 | Chatter et al. | 705/10 |

FOREIGN PATENT DOCUMENTS

| KR | 10-2001-0014873 | 10/2002 |
|---|---|---|
| KR | 10-2002-7012854 | 4/2003 |

OTHER PUBLICATIONS

Andrew Ellam, Overture and Google: Internet Pay-Per-Click (PPC) Advertising Auctions, journal, Mar. 2003, 1-17, LBS reference CS-03-022, London Business School.

* cited by examiner

*Primary Examiner* — Ig T An
(74) *Attorney, Agent, or Firm* — Hyunho Park

(57) ABSTRACT

A method and system for determining a position of information related to a media or data content based on an intention of a client concerned are provided. The method includes transmitting the content to the client, determining the position of the information based on the intention of the client, transmitting the determined position of the information to the client, and displaying and providing the content and the information having the determined position for the client. The system includes a content server providing the content to the client, an account management server managing an account of the client and generating a bid value submitted by the client for providing the information to the client, and a service management server receiving the bid value from the account management server, positioning the information according to the bid value, and providing the information to the client.

20 Claims, 8 Drawing Sheets

| Item | Service State | Rank | Minimum Price to be 1st Rank | Input Bid Price (Rank) | |
|---|---|---|---|---|---|
| Shoes 1 | 3120 | 10 | $ 1.50 | $ 1.00  (8) update | Ub |
| Shoes 2 | 1200 | 5 | $ 1.00 | $ 0.50  (4) update | |
| ⋮ | ⋮ | ⋮ | ⋮ | ⋮ | IP |

FIG. 8

| Item | Service State | Rank | Minimum Price to be 1st Rank | Input Bid Price (Rank) | |
|---|---|---|---|---|---|
| Position 1 | 3120 | 10 | $ 1.50 | $ 1.00  (8) update | Ub |
| Position 2 | 1200 | 5 | $ 1.00 | $ 0.50  (4) update | |
| ⋮ | ⋮ | ⋮ | ⋮ | ⋮ | IP |

FIG. 9

METHOD AND SYSTEM FOR DETERMINING A POSITION OF INFORMATION BASED ON AN INTENTION OF A PARTY CONCERNED

PRIORITY

This application claims priority under 35 U.S.C. §119 to an application filed in the Korean Intellectual Property Office on Jan. 9, 2007 and assigned Serial No. 10-2007-0002371, the contents of which are incorporated herein by reference.

BACKGROUND OF THE INVENTION

1. Field of the Invention

The present invention relates generally to a system of media and data service over communication or broadcasting networks, and in particular, to a system and method for enabling a service provider, service users, and information providers such as advertisers to influence a position of information.

2. Description of the Related Art

Multimedia and data content services over Internet or broadcasting network become popular and ubiquitous these days. Multimedia content service includes a service of downloading or streaming media contents such as audio and video data. Multimedia services are provided as a type of Video on Demand (VOD) or streaming service such as Internet Protocol Television (IPTV), Digital Television (DTV), and User Created Content (UCC). Data contents service includes a service of providing data or information from a server to clients. Push/pull service and traffic/weather/local information service are examples.

Such multimedia and data content services are spreading rapidly, and needs for data services that link service contents with additional information such as advertisement are increasing. Internet user population is increasing fast and, thus, online advertisement becomes popular to promoters and advertisers due to the relatively low expense and easy accessibility of viewers.

However, it has been hard for advertisers to influence the position of their own advertisement or information in or around service content. Information providers or advertisers does not have methods to influence their advertisement positions placed in a service content and to affect their advertisement's positions on the viewers' screen in real time in a multimedia or data content services environment over Internet or broadcasting network.

SUMMARY OF THE INVENTION

An object of the present invention is to solve at least the above problems and/or disadvantages and to provide at least the advantages below. Accordingly, the present invention provides a method and system for determining a position of information related to a media or data content based on an intention of a client concerned.

According to one aspect of the present invention, there is a system for providing a media or data content and information related to the content to a client. The system comprises a content server providing the content to the client using a network, an account management server managing an account of the client and generating a bid value submitted by the client through a bidding process for providing the information related to the content to the client using the network, and a service management server receiving the bid value from the account management server, positioning the information related to the content according to the bid value, and providing the information to the client using the network, when the client can be at least one of a user of the content, an information provider, and a content provider.

According to another aspect of the present invention, there is a method for providing a position of information related to a media or data content based on an intention of a client in a system using an application that runs through a screen on the client to provide the content. The method comprises transmitting the content requested by the client to the client from a content server, determining the position of the information related to the content based on the intention of the client, transmitting the determined position of the information related to the content to the client, and displaying and providing the content and the information having the determined position for the client.

According to still another aspect of the present invention, there is a machine-readable medium containing instructions which, when executed by a processing system, cause the processing system to perform a method for providing a media or data content, and information related to the content to a client in the processing system, when the client can be at least one of a user of the content, an information provider, a content provider, and a service provider. The method comprises determining a position of the information related to the content received from the client according to an intention of the client, and arranging and displaying the information on a screen according to the position determined, when the intention of the client includes at least one of a bid value from the information provider for the position, a predetermined rule, a preference of the user of the content, a personality of the user of the content, a geographic location of the user of the content, and timing of the transmitting of the content requested by the client, sending and receiving data using a broadcasting or a communication network, requesting a service of the content, monitoring if there is an inquiry of the information of an item related to the content from the client while running the service of the content, and requesting the information related to the content, transmitting the service request from the client to a service provider, transmitting the inquiry of the information from the client to the service provider, synchronizing the information related to the content and the content provided to the client in a real time, and displaying the information and the content through the screen on the client.

BRIEF DESCRIPTION OF THE DRAWINGS

The above and other objects, features and advantages of the present invention will become more apparent from the following detailed description when taken in conjunction with the accompanying drawings in which:

FIG. 8 illustrates a display on an information provider's screen showing a status of a bidding process for information of each item related to certain content according to the present invention; and FIG. 9 illustrates a display on an information provider's screen showing a status of a bidding process for different positions of information to be located at according to the present invention.

DETAILED DESCRIPTION OF THE EXEMPLARY EMBODIMENTS

Figure 1:
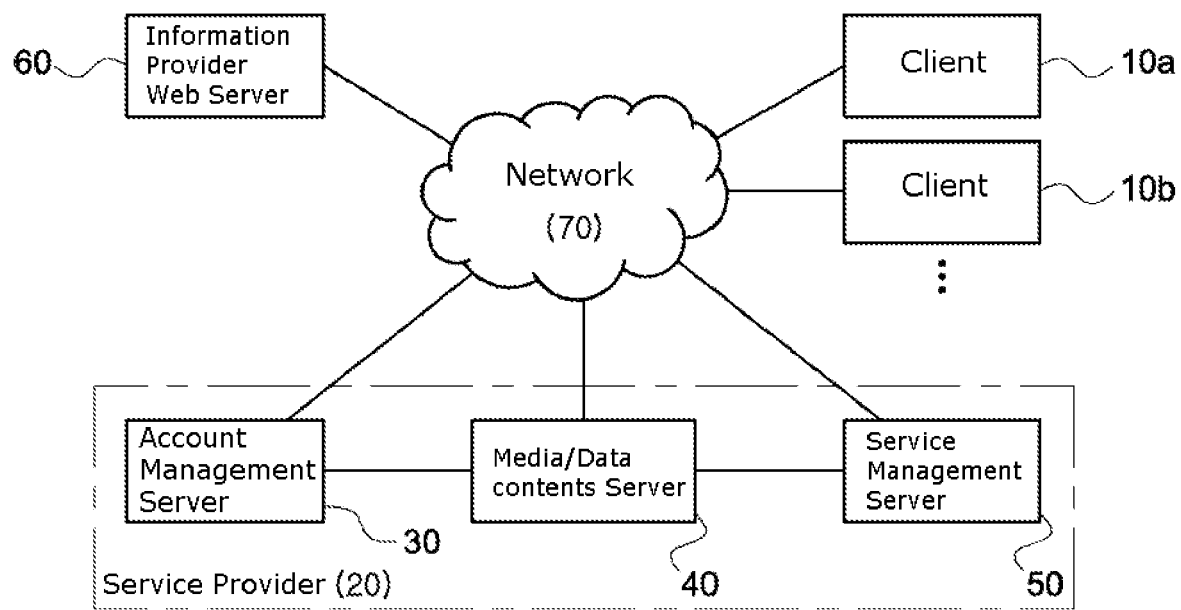
FIG. 1 is a block diagram of distributed system architecture according to the present invention.

The present invention provides a method enabling a media or data content service participants, such as a user of the media or data content, an information provider, and a content provider, to be able to affect the position of information, such as advertisements that are related to the content serviced within a screen. The present invention further provides a system implementing the method that enables the service participants to influence the relative position of information in terms of the content.

The present invention also provides a method of arranging the relative position of information in the client side with service users' preference by providing and installing a position decision program from service provider to the client.

In an exemplary embodiment, as a method of determining and arranging the position of information related to service contents and providing advertisements to clients, the method includes transmitting a requested content from a contents server to clients; and sending information related to the service contents with positions influenced by an intention of the clients, such as bid prices and pre-defined rules, from a server to clients.

It is desirable that the method of sending information related to the service contents with positions influenced by an intention of the clients includes requesting bid prices of information related to service contents from an web service server to an account management server; sending information and bid prices from the account management server to the web service server when bid prices about information exists. The web service server determines and arranges the positions of information according to bid prices and pre-defined rules, and sends information with positions to clients to display the information on the clients screen.

A server/client service system in the present invention of influencing the position of the service related information by a bid value for items in the content, service participants, and site promoters such as advertisers includes; a contents server that provide media and data contents to clients over a network; a account management server that consists of a database which contains advertisers account information and a processing system which manages bids process for the positions of information; and a service server that receives bid prices from the account management server, arranges the positions of information with bid prices, and provides arranged information to clients over networks.

To achieve methods described above, a position determining computer program in a client side includes transmitter/receiver unit that receives/transmits data and requests over network; a control unit that manages signal flows and monitors a request of service contents related information by an user; a service request unit that sends a service request to the service server; an information request unit that transmits a request of service contents related information to server or a site promoter; a position arrangement unit that rearranges the positions of information with pre-defined rules such as user personal information, user's preference, or local information; and an information linking unit that links service contents and information to display on an user's screen.

The presented invention also discloses a system and method of influencing positions of information, which are related to user selected service contents determined by a site promoter and a service user in contents service network system. A promoter can be an advertiser to advertise their product or web site, and can influences advertising positions on user's screen. Service user can provide personal information and influence information position on the user's screen. In this case, user's personal information such as local information, time information, age, sex, occupation, and preferences can be stored in a database of a client device or in a server. As a result, a promoter's intention can affect the positions of information transmitted by service server, and service user's preferences can influence the display position of information on a client's screen.

The terms used in this invention are defined here. Contents mean media contents or data contents. Media contents mean multimedia contents such as video and audio serviced in diverse networks such as Internet and broadcasting. One example of media content is a video such as movies and can be serviced as a form of Video on Demand (VOD) or Streaming. Data contents include information data such as traffic/weather information, news, or local map data. Item means a specific part of content, and can be an object for advertisement or information of serviced contents. For example, when a movie is content serviced, an item, such as a watch, eye glasses, or shoes that an actor or actress in the movie is wearing can be an individual item that an information or advertisement provider is targeting for. A movie itself can also be an item. Likewise, an actor or an actress in the movie himself or herself can also be an item. Client can select an item in a displayed content.

Information means illustrations for an item, for example, descriptions, link address, or advertising list for an item. The information is related to an item related to the content and represented by at least one of a form of a title, a description, a picture, a movie, a sound, and a Uniform Resource Locator (URL). Information request means action or signal transmitted from a client to a service server to request information for an item, and it comprises the active request such as user request by clicking an item with a mouse and typing with a keyboard, and the inactive request such as automatic signal transmission without user's action. Information can be transmitted from a service server to clients without user's request either.

Exemplary embodiments of the present invention will be described herein below with reference to the accompanying drawings.

Referring to the drawings, FIG. 1 is a block diagram of distributed system architecture according to an exemplary embodiment of the present invention that determines positions of information based on promoters and/or users' intention. The block diagram of FIG. 1 shows a distributed system comprising at least one client 10*a* or 10*b*, an account management server 30, a media and/or data contents server 40, and a service management server 50. Although the account management server 30, the media and/or data contents server 40, and the service management server 50 is located in a service provider side 20, locations of the servers are not limited only to the service provider side 20. The clients 10 can be a user of the content, an information provider, and a content provider.

The account management server 30 stores advertiser's accounts and item lists of service contents, and allows advertisers in a client side 10a or 10b to participate a bidding process using an account registered in the account management server 30. An Advertiser logs in the account management server 30 and participants in a bidding process for the position of an item provided in the account management server. For this process, the account management server 30 provides useful information of the bidding process, such as current bid items, participants' rank information to the advertisers 10.

The service management server 50 interacts with the clients 10 to provide a service of contents and content related information. The service management server 50 stores service contents items related information and pre-defined position decision rules, and provides information and positions to the clients 10. Pre-defined rules in the service management server 50 can employ bid prices transmitted from the account management server 30, personal information of service user, and/or other decision rules. For this process, personal information of a service user, information for service contents related item, and bids prices from the account management server 30 can be stored in the service management server 50. Information for items includes an advertisement list and descriptions of items. The information related to the content can be created for an item included in the content requested by the user of the content, or for an item related to the content predetermined and pre-selected by the service management server 50.

The service management server 50 transmits positions for information to the clients 10. For example, when a client 10a requests information of an item in a service content, the service management server 50 receives advertisements and bid prices of the item from a account management server 30, arranges the position of advertisement based on the bid price, makes a link between the item in the content and information, and transmits it to the client 10a. The service management server 50 also receives the final display result of the position of each advertisement for items from the client, analyzes the display result in client sides, and transmits the analysis result to the account management server. This statistic information can be provided to the bid participants in the account management server 30 for the reference of bidding process state.

Contents server 40 stores media and data contents, and makes a service for a service user 10a when a client 10a or the service management server 50 requests transmission of the content. Media content includes images, video data, and audio data, and can be serviced over diverse types of networks. Media content service using IP-based protocols such as Hypertext Transfer Protocol (HTTP), Real Time Streaming Protocol (RTSP), and Session Initiation Protocol (SIP), broadcasting protocols such as Transport Stream (TS), are possible. Examples of service type are Internet Protocol Television (IPTV), Digital Television (DTV), Video on Demand (VOD), and streaming. Examples of data contents are news, local information, traffic information, weather information, game, and software. Data content service such as download, push/pull over communication or broadcasting network can be possible.

The clients (10a, 10b . . . ) can mean service users who use contents and information service, and promoters who participate in bids for item information. Clients may use a computer or other devices. A promoter or an advertiser promotes their website or product by participating in bids for information space of specific items. The service provider 20 provides a bid system to make advertiser participate a bid to influence the position of information related to the item.

The present invention provides that the information position can be determined in the service provider side 20, and/or can be rearranged and displayed in a client side with a rule defined in the client side. The information position can be determined with bid rank of information, personal information of a service user, or other data. In the case of service provider side's position determination, the bid rank of information is provided from the account management server 30, user's personal information are stored in the customer database of the service management server 5, and information position is determined based on these data. In the case of client side's position determination, a client receives information and its positions determined in the service provider side 20 and rearranges positions according to the rules defined in the client side (10a, 10b . . . ).

For the position determination process in client side, this invention provides that service provider 20 can distribute position decision program to clients, and install the program in the client device such as computer and mobile device to execute this function. It's reasonable to distribute and provide a program with the methods of downloading software or other methods such as CD recording media or s/w distribution over the air.

Number 60 in FIG. 1 represents an advertiser's web site such as Internet shopping mall web server. Each advertisement in information list about a certain item displayed in a user can be an advertiser's web site.

Servers and client devices in FIG. 1 can be connected over Internet or different type of a network 70 such as Local Area Network (LAN), Wide Area Network (WAN), wire/wireless broadcasting and communication network. For example, the contents server 40 can be connected to the clients 10a or 10b over broadcasting network, service management server 5 can be connected to the clients 10 over internet or wireless communication network, and the account management server 30 can be connected to the clients 10 over internet concurrently in one service system.

Figure 2:
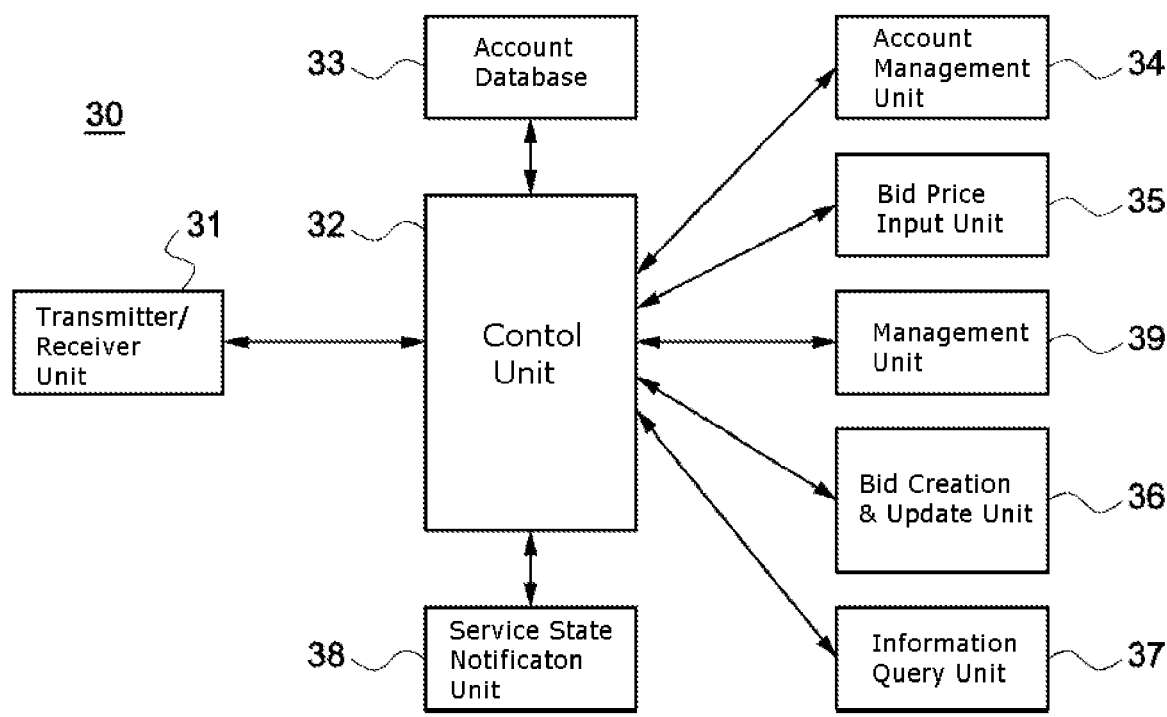
FIG. 2 is a block diagram of the account management server of FIG. 1 according to the present invention.

FIG. 2 is a block diagram of the account management server 30 of FIG. 1 according to an exemplary embodiment of the present invention. The account management server 30 includes a communication unit or a transmitter/receiver unit 31 for sending and receiving data over network. The transmitter/receiver unit 31 supports diverse protocols of broadcasting and communications.

It also equips a control unit 32 controlling overall processes of the account management server 30. More specifically, the control unit 32 manages promoters' accounts and bid prices for items. It monitors updated bid prices and newly added items on service contents, and transmits requested data to the service server in FIG. 1 when the service server requests bid prices of an item.

The account management server 30 includes an account database 33 storing advertisers' accounts, items list for bids bid prices, and bids log. The account management server 30 also includes an account management unit 34 providing account information such as new account subscription to the control unit 32, a bid price input unit 35 providing an input method that advertisers can suggest new bid prices with, a bid process generating unit or a bid creation & update unit 36 creating a bid for new item and updating bids information in database, and an information query unit 37 querying bid prices for an item and transmitting it to the service server. It also has a service state notification unit 38, which provides current bid state details to promoters who participate in a bid. The account management server 30 has a management unit making a server administrator be able to setup necessary functions in the system.

The account management server 30 described above provides an online input method with a bid price input unit 35 to enable advertisers input bid price online, and the bid price are presented to the account database 33 with the bid creation & update unit 36, and an update status is notified to advertisers who participate in a bid using the service state notification unit 38. The service state notification unit 38 also can display information of a current bid process and inform a client's current bidding status to the client.

When a service user selects an item on a service content and the request of information for the item is transmitted to the service server and the account management server 30, the information query unit 37 in the account management server 30 queries current bid prices of the item in the account database 33 and transmits it to the service server. Service server then arranges the positions of information or advertisements based on bid prices and other pre-defined rule. Information or advertisements for the item are finally displayed on the user's screen with arranged positions.

Figure 3:
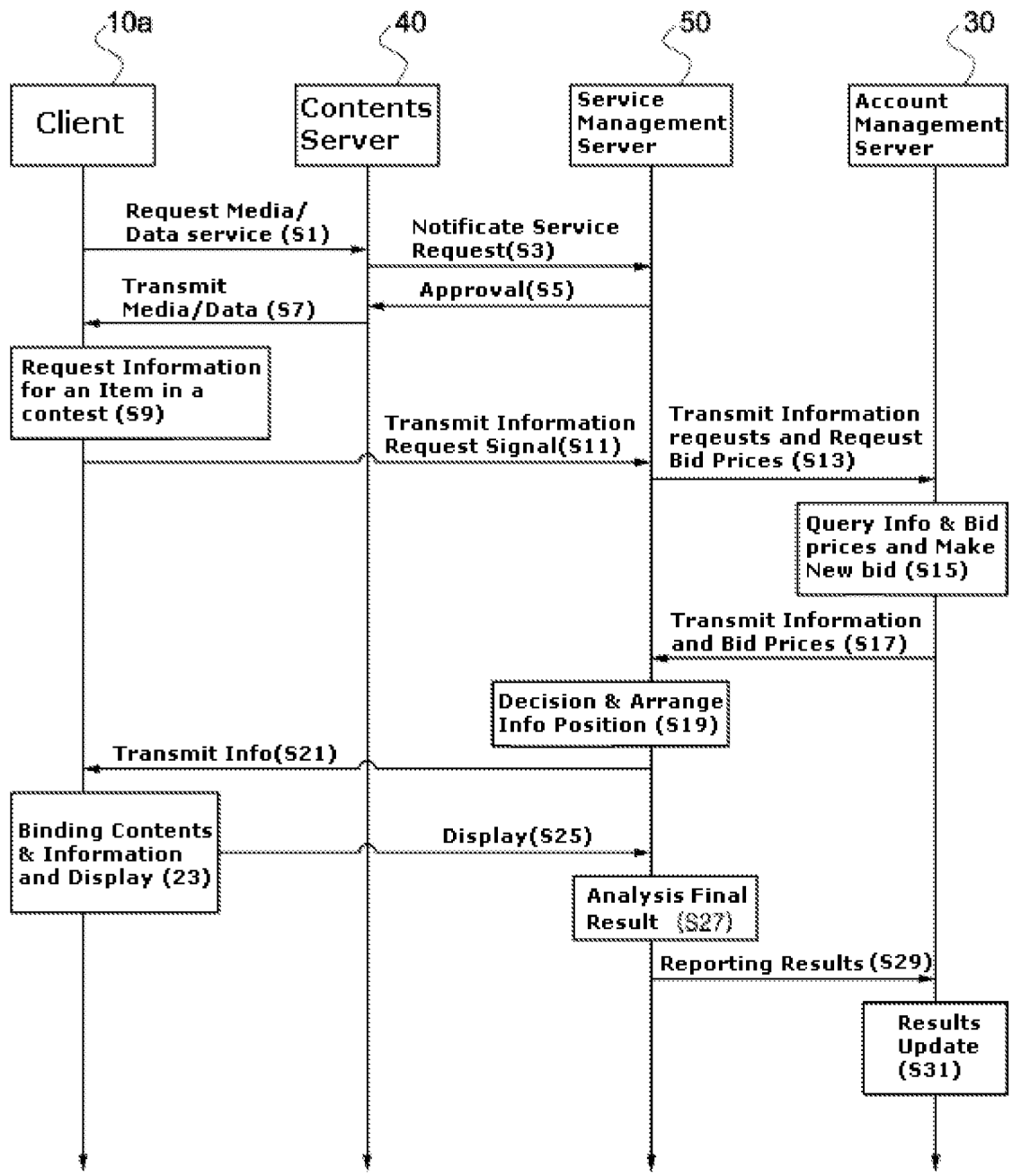
FIG. 3 is a diagram illustrating a method of determining the position of information influenced by participants according to the present invention.

FIG. 3 is a diagram illustrating a method of determining the position of information influenced by participants according to an exemplary embodiment of the present invention. When a service user in the client side 10a requests a service to the service provider (S1), the contents server 40 notifies a service request to the service management server 50 (S3). The service management server 50 sends an approval signal to the contents server 40 (S5). The contents server 40 transmits the requested content to the client 10a and starts to make a service (S7). During a client 10a is using a service, when a service user requires information of items on service content, the service user can select an item and the client side 10a sends an information request signal to the service management server 50 (S9, S11). User can select an item by clicking the item itself or an icon for the item with a mouse, typing item request with keyboard, or configuring automatic request setup with software.

The service management server 50, which receives the information request forwards the request to the account management server 30 and waits for information and bid price about the item (S13). The account management server 30 queries information and bid prices for the item (S15) and transmits queried data to the service management server 50 (S17). If the account management server 30 does not find information and bid prices, it transmits arbitrary information and its bid prices to the service management server 50 and makes a new bid for the item. The service management server 50 determines the positions of information based on received data and pre-defined rules (S19), and transmits all to the client 10a (S21). Information and its positions for arbitrary items also can be delivered without a request of the client 10a during a contents service. Finally, service content and information related to the items are displayed on a client screen (S23).

Figure 4:
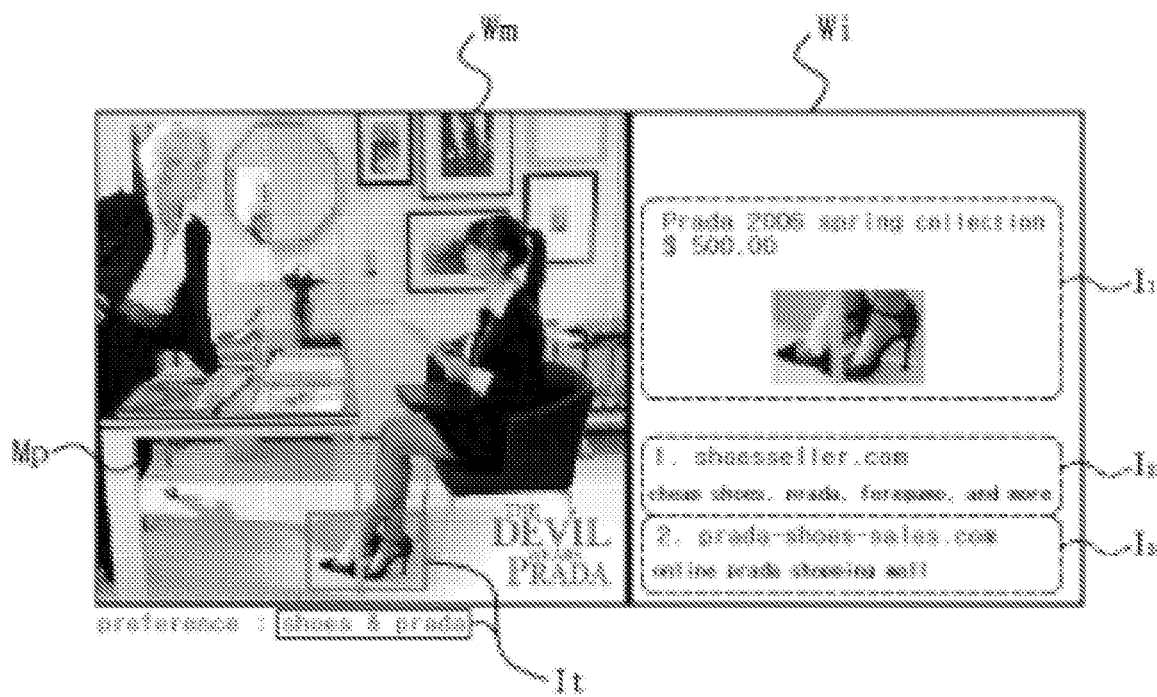
FIG. 4 illustrates an example of a user's screen displaying information for an item according to the present invention.

FIG. 4 illustrates an example of a user's screen displaying information for an item according to an exemplary embodiment of the present invention. With FIGS. 1-4, a practical exemplary embodiment of the present invention is described. A client screen of FIG. 4 shows that media content, a Movie (Mp), is being played and displayed in the place of 'media display area' (Wm). In addition, information (I1) and advertisements (I2, I3, . . . ) for a selected item (It) are displayed in the 'information display area' (Wi). FIG. 4 shows an example when a shoes item is selected. An item can be selected manually with input devices such as a mouse and keyboard. An item also can be automatically presented with content tag information and a pre-defined selection rule, as an example.

In FIG. 3, final display results in a client side 10a in FIG. 4 are transmitted back to the service management server 50 (S25). The service management server 50 analyzes data (S27) and the analyzed data or statistical data are sent to the account management server 30. The account database 33 are updated with new results, and information are displayed on the client' screen including the information providers or advertisers (S29, S31).

Figure 5:
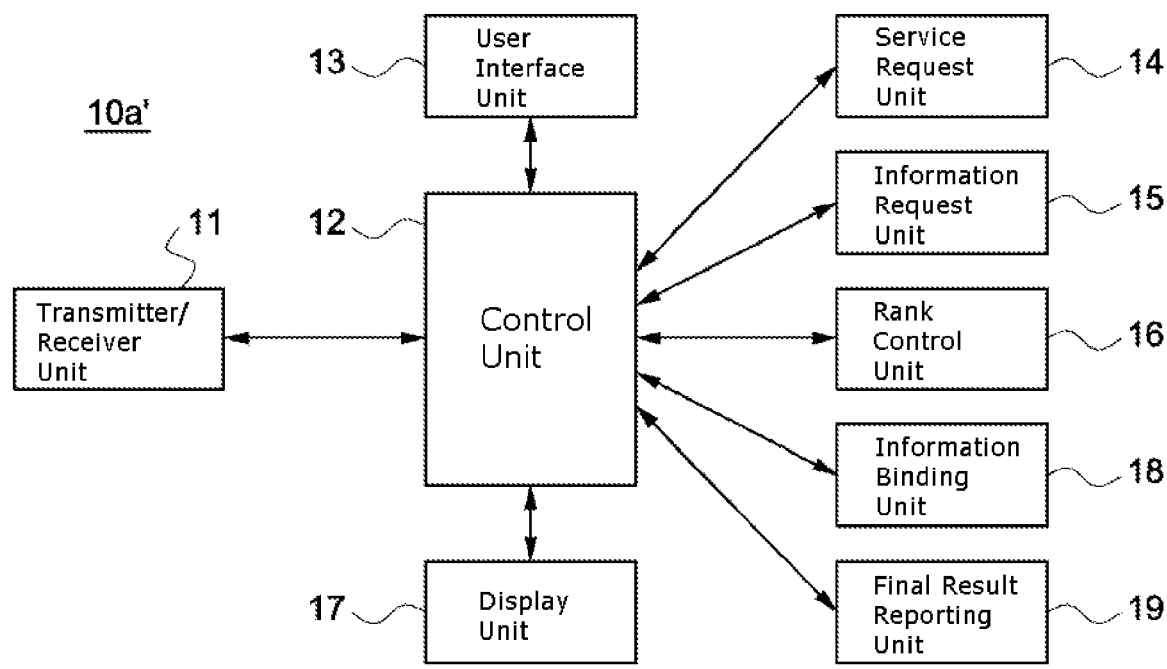
FIG. 5 is a block diagram of a system influencing the position of information for an item in a client side according to the present invention.

FIG. 5 is a block diagram of a system influencing the position of information for an item in a client side according to an exemplary embodiment of the present invention. A client system, and servers connected to this client included in FIG. 5 are the same as the system in FIG. 1. The client system in FIG. 5 can be implemented in the form of hardware or software, but software implementation is more reasonable in a particular case, such as this. Software can be installed in a client device by downloading a program from a service provider or with a recordable and/or a machine-readable and computer readable media like a CD disk. Each unit in FIG. 5 is equivalent to a module of the program.

In FIG. 5, the client 10a' has a transmitter/receiver unit 11 to send a request signal or receive data from a service provider over network. It also has a service request unit 14 requesting a contents service when a user makes a demand. The client 10a' has a control unit 12 monitoring information requests for items in the client and letting an information request unit 15 send a information request signal to a service provider. The control unit 12 forces the information request unit 15 to transmit a information request signal to a service provider when a user needs information about an item in contents. When information for an item is already received from the service provider, the rank control unit 16 utilizes received information. Information request in the client side 10a' can be generated manually by a user with a user interface unit 13 or automatically by the program. The rank control unit 16 in FIG. 5 rearranges the position of information for an item based on a pre-defined rule, a user's personal data, preferences, and etc. Rearranged position by the rank control unit 16 is informed to the information binding unit 18 linking with the item and positioning information in content. Information with rearrange positions are finally displayed in a display unit 17 which is usually a monitor or a screen showing a service content and information to the service user. The client 10a' has a final result reporting unit 19 which reports final positions and user's action to the service provider.

Figure 6:
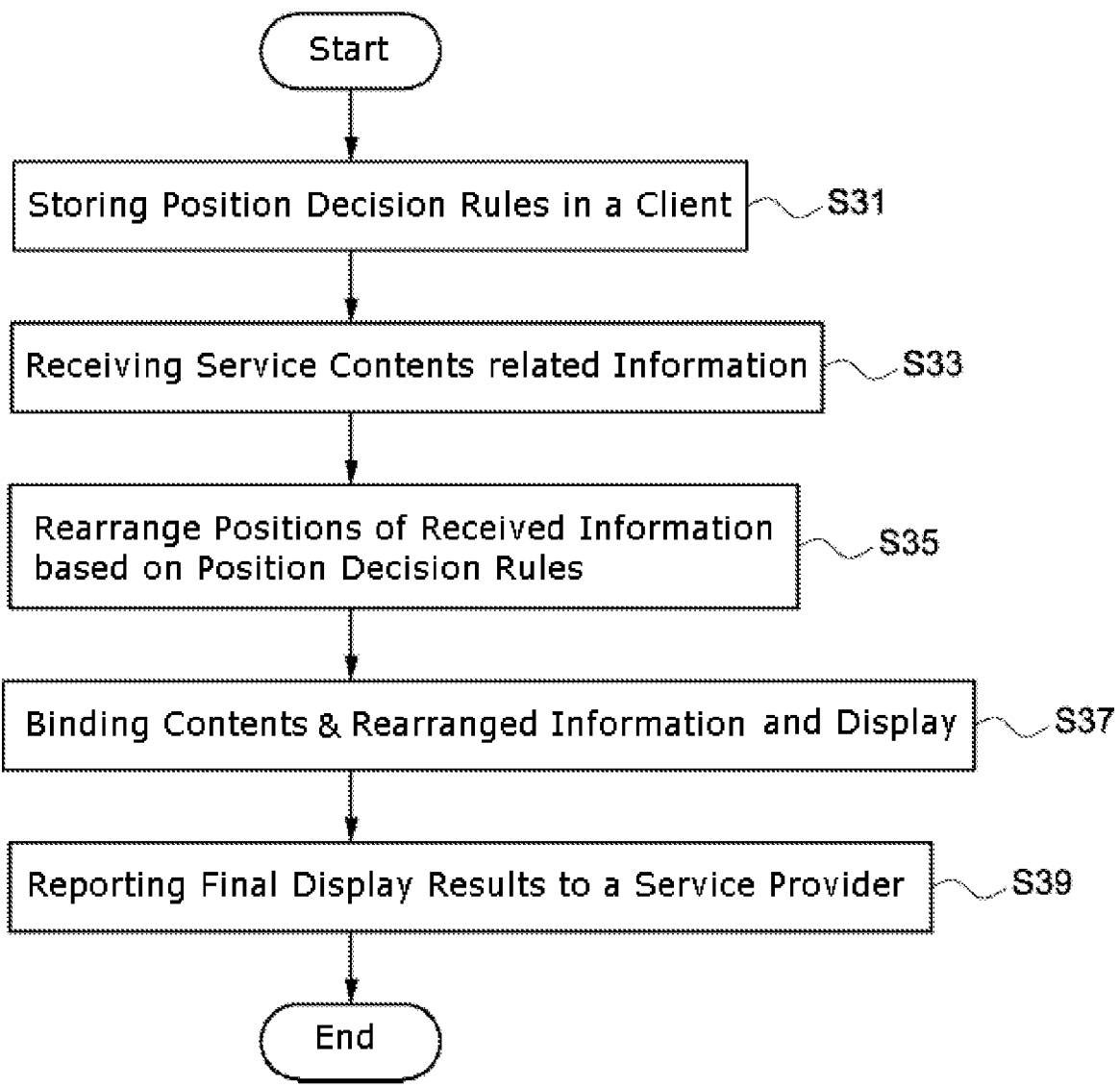
FIG. 6 is a flowchart illustrating a procedure of rearranging information positions in the client side described in FIG. 5 according to the present invention.

FIG. 6 is a flowchart illustrating a procedure of rearranging information positions in the client side described in FIG. 5 according to an exemplary embodiment of the present invention. A service user stores the user's information or preference in the client device in step S31. A service is started to transmit a content to the client 10a' after a service provider receives a service request from the user. Information for items in the content are transmitted from a service provider to a client 10a' with or without information request from the client in step S33. Transmitted information for the selected item has its positions, which are determined in the service provider with bid prices and pre-defined rules. After a content and Information for items of the content are received in the client via the transmitter/receiver unit 11, arranged positions of information are rearranged in the client with a pre-defined rule in step S35. Information with rearranged positions are then linked with items of the content and displayed on the display unit 17 of the client in step S37. Final display results are reported back to service provider with the final result reporting unit 19 in step S39. The report can be used to analyze users' preference. User can store their preferences in a client device before using a content service to rearrange the positions of information for items sent from a service provider.

Figure 7:
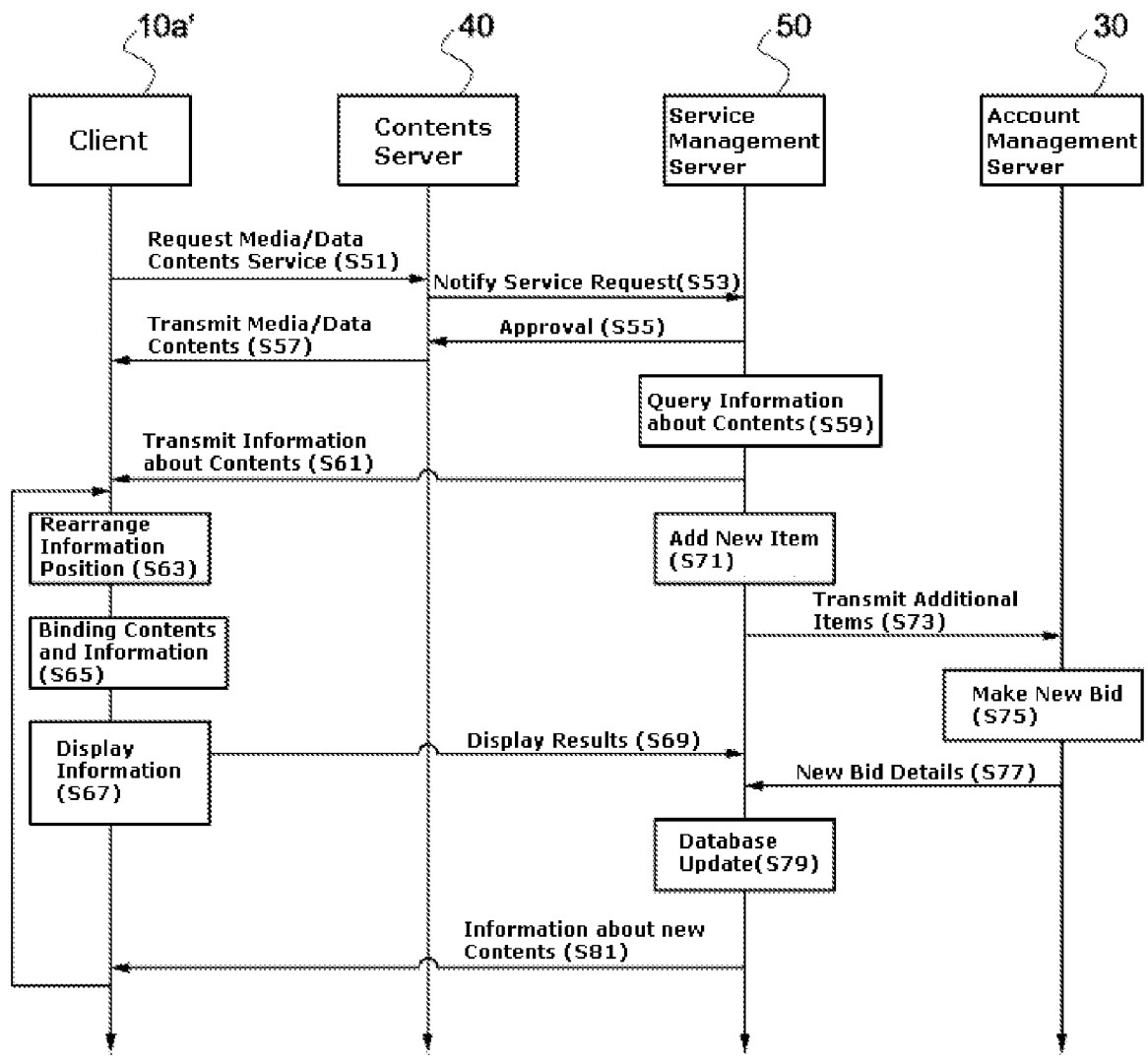
FIG. 7 is a diagram illustrating a method of influencing the position of information by participants according to the present invention.

FIG. 7 is a diagram illustrating a method of influencing the position of information by participants according to an exemplary embodiment of the present invention. FIG. 8 illustrates a display on an information provider or an advertiser's screen showing a status of a bidding process for information of each item related to certain content according to an exemplary embodiment of the present invention. FIG. 9 illustrates a display on an information provider's screen showing a status of a bidding process for different positions of information to be located at according to an exemplary embodiment of the present invention. The process of making a new bid during a service of media content and related information is explained with FIGS. 7-9.

When a client 10a' requests a service, a content server 40 notifies client's request to a service management server 50 (S51, S53). Then, the service management server 50 sends an approval signal to the content server 40 (S55). The content server 40 initiates a service and starts to transmit a content to the client 10a' (S57), and the service management server 50 starts to query and transmit information related to the service content to the client 10a' (S59, S61). This information includes bid prices and its positions for items. Positions of Information transmitted to the client 10a' are rearranged in the position rearrange unit in the client 10a' with a position decision rule, which utilizes bid prices for items and user's preference, as explained (S63). Items of the service content and information with rearranged positions are linked and finally displayed on user's screen (S65, S67). Final display result is transmitted to the service management server 50 (S69) to analyze users' preference. When a new item is registered in the service management server 50, it is informed to the account management server 30 (S71, S73). The account management server 30 then makes a new bid (S75), and a new bidding process starts (S75).

FIG. 8 shows an example of screen of an information provider or an advertiser who logs in to the account management server 30. Registered items of service media content in FIG. 8 are shoes1 and shoes2, as an example, and service state of selected items, rank of an item, and the minimum price to be the 1st rank of the registered item are displayed on the information provider's screen. Input box (IP) are also presented to allow the information provider to participate in the bid process. In the case of shoes1 in FIG. 8, for example, the item is displayed during 0~30 minutes during the media content service, selected 3120 times, the advertiser's rank for the item is 10th, and the minimum bid price to be the 1st rank among the registered items is $1.5. Input boxes (IP) and update buttons to submit a bid price are in the bid price input column. Number in the parenthesis next to the input boxes (IP) to the right shows an updated rank when the advertiser inputs a new bid price. In the case of the item, shoes1, in FIG. 8, the minimum number to be the 1st rank among the registered items is $1.5, and it is shown that when an advertiser inputs $1 as a bid price, rank of the advertiser and the advertiser's item, shoes1 in this case, becomes the rank 8th.

As shown in FIG. 7, after a new bid is made or updated in the account management server 30, it is informed to the service management server 50 and updates database (S77, S79) and then, new information is transmitted to the client 10a' (S81). The client 10a' performs a new information position arrangement process (S63) and a link process (S65), and accordingly, the final result is displayed on the client's screen.

Similar way as explained in FIG. 8, another exemplary embodiment of the present invention can show a bid process for bidding a bid value for a position of information or advertisement to be located at within a client side, such as within a screen of a content user and a service user. In this application, a position is one of the items. FIG. 9 shows an example of screen of an information provider or an advertiser who logs in to the account management server 30. Registered positions of information or advertisement location within a screen in FIG. 9 are position1 and position2, as an example, and service state of a particular position, rank of a position, and the minimum price to be the 1st rank of the registered position are displayed on the information provider or the advertiser's screen. Input box (IP) are also presented to allow the information provider to participate in the bid process. In the case of positions in FIG. 9, for example, the position is a very bottom location of the screen of the media content service, information located at the position is selected 3120 times so far, the advertiser's rank for the position1 is 10th, and the minimum bid price to be the 1st rank among the registered positions is $1.5. Input boxes (IP) and update buttons to submit a bid price are in the bid price input column as well. Number in the parenthesis next to the input boxes (IP) to the right shows an updated rank when the advertiser inputs a new bid price for the position corresponding to. In the case of the position1, in FIG. 9, the minimum number to be the 1st rank among the registered positions is $1.5, and it is shown that when an advertiser inputs $1 as a bid price for the position1, rank of the advertiser and the advertiser's position1, in this case, becomes the rank 8th.

General description of the present invention in terms of the exemplary embodiments with reference to the accompanying drawings above will be described herein below.

The present invention provides a system for providing a media or data content and information related to the content to a client comprises a content server providing the content to the client using a network, an account management server managing an account of the client and generating a bid value submitted by the client through a bidding process for providing the information related to the content to the client using the network, and a service management server receiving the bid value from the account management server, positioning the information related to the content according to the bid value, and providing the information to the client using the network.

The account management server includes a communication unit sending and receiving data through a broadcasting or a networking, an account database recording and storing at least one of account information, a bidding item, the bid value, and a bidding history of the client. The account management server also includes a bid value input unit enabling the client to bid a new bid value, a control unit controlling a set of process. The set of process includes monitoring if there is the new bid value for the information of the item related to the content and a new bid item, storing the new bid value for the information of the item related to the content and the new bid item in the account database, and transmitting data of a bid value for the information of the item related to the content to the service management server when there is a request of the bid value in the service management server.

The account management server further includes an account management unit updating a change of the account management server, when the updating includes registering a new account and deleting an existing account, and providing the updates to the control unit, a bidding process generating unit creating a new bidding process and updating the account database according to a change of a bidding process when there is the change of the bidding process through the bid value input unit. The account management server still further includes an inquiry unit transmitting the bid value for the information of the item related to the content to the service management server by inquiring the bid value for the information of the item related to the content, a bidding status reporting unit displaying information of a current bidding process and informing a client's current bidding status to the client.

The present invention provides a computer-implemented method for providing a position of information related to a media or data content based on an intention of a client in a system using an application that runs through a screen on the client to provide the content. The computer-implemented method comprises transmitting the content requested by the client to the client from a content server, determining the position of the information related to the content based on the intention of the client, transmitting the determined position of the information related to the content to the client, and displaying and providing the content and the information having the determined position for the client. The intention of the client includes a bid value from the information provider for the position, a predetermined rule, a preference of the user of the content, a personal information and a personality of the user of the content, a geographic location of the user of the content, and timing of the transmitting of the content requested by the client.

The computer-implemented method further comprises requesting an account management server of the bid value from the information provider for the position by a service management server, transmitting the bid value to the service management server according to the request by the account management server when the bid value exist, determining the position of the information related to the content based on the intention of the client, and displaying and providing the content and the information having the position for the client by the service management server. The computer-implemented method also comprises informing the service management server, by a content server, a request of the content when the user of the content requests a service provider through the content provider to send the content, sending an acknowledgement approving a service of the content requested from the user to the content server by the service management server, transmitting the requested content to the content provider by the content server according to the acknowledgement, and providing a service of the content. The computer-implemented method still further comprises ranking, by the service management server, a popularity of the displayed information and the item related to the content for the user of the content by observing an interaction of the user with the displayed information after displaying the information related to the content for the client, sending data of the rank and the observation to the account management server, updating the data in an account database, and providing the data to the information provider submitting the bid value.

The computer-implemented method displays the content and the information having the position for the client comprises registering a position decision factor by the user of the content for the client, adjusting the position of the information according to the position decision factor before displaying the information related to the content provided by the service provider, and displaying the adjusted position of the information for the client.

The present invention also provides a machine-readable medium containing instructions which, when executed by a processing system, cause the processing system to perform a method for providing a media or data content, and information related to the content to a client in the processing system. The method performed by the processing system, which executes the instructions in the machine-readable medium comprises determining a position of the information related to the content received from the client according to an intention of the client, and arranging and displaying the information on a screen according to the position determined, sending and receiving data using a broadcasting or a communication network, requesting a service of the content, monitoring if there is an inquiry of the information of an item related to the content from the client while running the service of the content, and requesting the information related to the content, transmitting the service request from the client to a service provider, transmitting the inquiry of the information from the client to the service provider, synchronizing the information related to the content and the content provided to the client in a real time, and displaying the information and the content through the screen on the client.

The method performed by the processing system, which executes the instructions in the machine-readable medium also comprises transmitting timing data of the inquiry of the information and inquiry data including the item list corresponding to the inquiry to the client if there is the inquiry of the information of the item, transmitting and informing for the client an ultimate position of the information displaying for the client, simulating a preview of a display of the information and the content corresponding to a different input value of the intention of the client, registering a positioning decision factor provided by the client, adjusting the position of the information related to the content transmitted to the client according to the positioning decision factor after displaying the information on the screen according to the position determined by the intention of the client. The positioning decision factor can include personal information of the client, a purchasing preference of the client, a purchasing habit of the client, and a bid value.

As described so far, the position decision method and system in the present invention allows service participants such as promoters and service users to reflect their preferences on display of information during a content services by influencing display locations of information for items in service contents. Accordingly, the present invention provides a method and system that makes a service user access preferred information by locating advertisements in high priority positions. The present invention also presents a method of exposing distinct advertisements to an individual service user based on users' preferences, and the method of exposing details of advertisements only to users who select an item. This method protects advertisers from spending unnecessary expenses for ineffective advertisement exposure.

Accordingly, the present invention provides advertisers a method of selecting an item and influencing a position within a service content by participating in an online competitive bidding process on a content service and by deciding advertisement prices by advertisers, and to service users by presetting preferences. Conventional content services do not provide a method and system of influencing information position to advertisers and service users, especially in media/data services, in contrast, the present invention allows it by combing bidding process and user preference and media/data services. The present invention also provides the method of enabling user-oriented service with an individual advertisement system and therefore increases sales efficiency for promoters.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A computer-implemented method for providing a position of information related to a multimedia content based on an intention of a viewer in a system to provide the multimedia content and the information related to the multimedia content, the method comprising:
   receiving, at the viewer of the multimedia content, the multimedia content using a network;
   determining the position of the information related to the multimedia content;
   storing, at a device of the viewer of the multimedia content, a position decision factor provided by the viewer of the multimedia content;
   adjusting the position of the information based on the position decision factor stored at the device of the viewer of the multimedia content; and
   displaying the information related to the multimedia content according to the adjusted position for the viewer.

2. The computer-implemented method of claim 1,
   wherein the multimedia content includes a motion picture, a movie, and a streaming video, and
   wherein the information related to the multimedia content includes at least one of information for an item appeared on the multimedia content and information for an item related to the multimedia content, and
   wherein the information is presented by a format, wherein the format is a title, a description, a picture, a movie, a sound, or a Uniform Resource Locator (URL).

3. The computer-implemented method of claim 1, wherein the intention of the viewer includes at least one of a predetermined rule, a preference of the viewer of the multimedia content, personal information of the viewer of the multimedia content, a personality of the viewer of the multimedia content, a geographic location of the viewer of the multimedia content, a purchasing preference of the viewer of the multimedia content, a purchasing habit of the viewer of the multimedia content, and a timing of transmission of the multimedia content requested by the viewer.

4. The computer-implemented method of claim 2, further comprising:
   receiving, at the device of the viewer of the multimedia content, the information having the position for the item when the viewer of the multimedia content selects the item appeared on the multimedia content.

5. The computer-implemented method of claim 4, further comprising:
   ranking, at the device of the viewer of the multimedia content, a popularity of the information for the viewer of the multimedia content by observing an interaction of the viewer with the information after providing the information related to the multimedia content for the viewer; and
   ranking a popularity of the item appeared on the multimedia content based on the viewer's selection of the item appeared on the multimedia content.

6. The computer-implemented method of claim 5, further comprising:
   providing the adjusted position of the information based on the position decision factor to the viewer, wherein the position decision factor includes at least one of a preference of the viewer of the multimedia content, personal information of the viewer of the multimedia content, a personality of the viewer of the multimedia content, a purchasing preference of the viewer of the multimedia content, a purchasing habit of the viewer of the multimedia content, a predetermined rule, a geographic location of the viewer of the multimedia content, a timing of transmission of the multimedia content requested by the viewer, the popularity of the information, and the popularity of the item.

7. The computer-implemented method of claim 6, further comprising:
   simulating a preview of the position of the information with the multimedia content based on a different position decision factor; and
   providing the preview of the position of the information with the multimedia content for the viewer.

8. The computer-implemented method of claim 1, wherein the position of the information is located within a window of the multimedia content.

9. The computer-implemented method of claim 1, wherein the position of the information is located outside of a window of the multimedia content.

10. A system for providing a position of information related to a multimedia content based on an intention of a viewer to provide the multimedia content and the information related to the multimedia content, the system comprising:
    a content server, the content server transmitting the multimedia content to a viewer of the multimedia content using a network;
    a service management server, the service management server determining the position of the information related to the multimedia content; and
    an account management server, the account management server storing, at a device of the viewer of the multimedia content, a position decision factor provided by the viewer of the multimedia content,
    wherein the service management server adjusts the position of the information according to the position decision factor.

11. The system of claim 10, wherein the service management server displays the information related to the multimedia content according to the adjusted position for the viewer, and
    wherein the multimedia content includes a motion picture, a movie, and a streaming video, and
    wherein the information related to the multimedia content includes at least one of information for an item appeared on the multimedia content and information for an item related to the multimedia content, and
    wherein the information is presented by a format, wherein the format is a title, a description, a picture, a movie, a sound, or a Uniform Resource Locator (URL).

12. The system of claim 11, wherein the service management server provides the viewer of the multimedia content with the information for the item when the viewer of the multimedia content selects the item appeared on the multimedia content.

13. The system of claim 12, wherein the service management server ranks a popularity of the information for the viewer of the multimedia content by observing an interaction of the viewer with the information, ranks a popularity of the item appeared on the multimedia content based on the viewer's selection of the item appeared on the multimedia content,
    simulates a preview of the position of the information with the multimedia content based on a different position decision factor, and provides the preview of the position of the information with the multimedia content for the viewer.

14. The system of claim 3, wherein the position decision factor includes at least one of a preference of the viewer of the multimedia content, personal information of the viewer of the multimedia content, a personality of the viewer of the multimedia content, a purchasing preference of the viewer of the multimedia content, a purchasing habit of the viewer of the multimedia content, a predetermined rule, a geographic location of the viewer of the multimedia content, a timing of transmission of the multimedia content requested by the viewer, the popularity of the information, and the popularity of the item.

15. A non-transitory computer readable medium storing computer readable instructions which, when executed by a computer system, perform a method for providing a position of information related to a multimedia content based on an intention of a viewer in a system to provide the multimedia content and the information related to the multimedia content, the method comprising:

receiving, at a viewer of the multimedia content, the multimedia content using a network;

determining the position of the information related to the multimedia content;

storing, at a device of the viewer of the multimedia content, a position decision factor provided by the viewer of the multimedia content; and adjusting the position of the information based on the position decision factor stored at the device of the viewer of the multimedia content.

16. The non-transitory computer readable medium of claim 15, wherein the multimedia content includes a motion picture, a movie, and a streaming video, and wherein the information related to the multimedia content includes at least one of information for an item appeared on the multimedia content and information for an item related to the multimedia content, and wherein the information is presented by a format, wherein the format is a title, a description, a picture, a movie, a sound, or a Uniform Resource Locator (URL).

17. The non-transitory computer readable medium of claim 16, wherein the method further comprises:

receiving, at the device of the viewer of the multimedia content, the information having the position for the item when the viewer of the multimedia content selects the item appeared on the multimedia content.

18. The non-transitory computer readable medium of claim 17, wherein the method further comprises:

ranking, at the device of the viewer of the multimedia content, a popularity of the information for the viewer of the multimedia content by observing an interaction of the viewer with the information after providing the information related to the multimedia content for the viewer; and ranking a popularity of the item appeared on the multimedia content based on the viewer's selection of the item appeared on the multimedia content.

19. The non-transitory computer readable medium of claim 18, wherein the method further comprises:

providing the adjusted position of the information based on the position decision factor to the viewer, wherein the position decision factor includes at least one of a preference of the viewer of the multimedia content, personal information of the viewer of the multimedia content, a personality of the viewer of the multimedia content, a purchasing preference of the viewer of the multimedia content, a purchasing habit of the viewer of the multimedia content, a predetermined rule, a geographic location of the viewer of the multimedia content, a timing of transmission of the multimedia content requested by the viewer, the popularity of the information, and the popularity of the item; and displaying the information related to the multimedia content according to the adjusted position for the viewer.

20. The non-transitory computer readable medium of claim 19, wherein the method further comprises:

simulating a preview of the position of the information with the multimedia content based on a different position decision factor; and providing the preview of the position of the information with the multimedia content for the viewer.

* * * * *